(12) United States Patent
Ohno et al.

(10) Patent No.: US 8,003,190 B2
(45) Date of Patent: Aug. 23, 2011

(54) HONEYCOMB STRUCTURE

(75) Inventors: Kazushige Ohno, Gifu (JP); Kazutake Ogyu, Gifu (JP)

(73) Assignee: Ibiden Co. Ltd, Gifu (JP)

( * ) Notice: Subject to any disclaimer, the term of this patent is extended or adjusted under 35 U.S.C. 154(b) by 240 days.

(21) Appl. No.: 11/376,571

(22) Filed: Mar. 16, 2006

(65) Prior Publication Data

US 2006/0210765 A1    Sep. 21, 2006

(30) Foreign Application Priority Data

Mar. 16, 2005   (JP) ............................... P2005-075970

(51) Int. Cl.
*B32B 3/12* (2006.01)
*B01D 39/06* (2006.01)
*C04B 35/64* (2006.01)
*B28B 11/16* (2006.01)

(52) U.S. Cl. ......... 428/116; 428/34.5; 501/154; 55/523; 264/630

(58) Field of Classification Search ................. 428/116, 428/117, 118, 119, 188, 913, 327, 73, 307.5, 428/34.5, 177, 304.4, 192; 501/118, 119, 501/120, 153, 154; 55/523, 585.3, 583, 502, 55/529; 264/177.12
See application file for complete search history.

(56) References Cited

U.S. PATENT DOCUMENTS

| | | | | |
|---|---|---|---|---|
| 5,820,967 | A | * | 10/1998 | Gadkaree ...................... 428/116 |
| 6,696,130 | B1 | * | 2/2004 | Kasai et al. ................... 428/116 |
| 7,396,586 | B2 | | 7/2008 | Ohno et al. |
| 2004/0055265 | A1 | * | 3/2004 | Ohno et al. .................... 55/523 |
| 2004/0071931 | A1 | | 4/2004 | Kai et al. |
| 2004/0092381 | A1 | * | 5/2004 | Beall et al. .................... 501/134 |
| 2004/0097370 | A1 | * | 5/2004 | Ichikawa et al. ............. 502/439 |
| 2005/0161849 | A1 | * | 7/2005 | Ohno et al. ..................... 264/43 |
| 2006/0021310 | A1 | | 2/2006 | Ohno et al. |
| 2006/0037297 | A1 | | 2/2006 | Hijikata |
| 2006/0051556 | A1 | | 3/2006 | Ohno et al. |
| 2006/0073970 | A1 | | 4/2006 | Yamada |
| 2006/0144027 | A1 | | 7/2006 | Ichikawa et al. |
| 2006/0216466 | A1 | | 9/2006 | Yoshida |
| 2006/0216467 | A1 | | 9/2006 | Yoshida |
| 2006/0222812 | A1 | | 10/2006 | Koyama et al. |
| 2006/0225930 | A1 | | 10/2006 | Schulte |
| 2006/0230732 | A1 | | 10/2006 | Kunieda |

(Continued)

FOREIGN PATENT DOCUMENTS

EP    1 482 138 A1    12/2004

(Continued)

OTHER PUBLICATIONS

World of Carbon, density of carbon: http://invsee.asu.edu/nmodulues/carbonmod/density.html (2009), no author available.*

(Continued)

*Primary Examiner* — David R Sample
*Assistant Examiner* — Nicole T Gugliotta
(74) *Attorney, Agent, or Firm* — Foley & Lardner LLP

(57) ABSTRACT

A honeycomb structure including a plurality of cells arranged in parallel while being separated by cell walls, and extending in a longitudinal direction of the honeycomb structure. Each cell is sealed at one of end portions thereof. In the honeycomb structure, the relation expressed by an expression (1) is satisfied:

$$11/6 - 10/3 \times A \leq B \quad (1)$$

where A (mm) designates thickness of the cell walls, and B ($m^2/cm^3$) designates a surface area per unit volume of the cell walls.

24 Claims, 6 Drawing Sheets

U.S. PATENT DOCUMENTS

| | | |
|---|---|---|
| 2007/0020155 A1 | 1/2007 | Ohno et al. |
| 2007/0068128 A1 | 3/2007 | Oshimi et al. |
| 2007/0128405 A1 | 6/2007 | Sakaguchi et al. |
| 2007/0130897 A1 | 6/2007 | Sakaguchi et al. |
| 2007/0169453 A1 | 7/2007 | Hayakawa |
| 2007/0178275 A1 | 8/2007 | Takahashi |
| 2007/0196620 A1 | 8/2007 | Ohno et al. |
| 2007/0212517 A1 | 9/2007 | Ohno et al. |
| 2007/0293392 A1 | 12/2007 | Ohno et al. |
| 2008/0083202 A1 | 4/2008 | Kunieda et al. |
| 2008/0120950 A1 | 5/2008 | Ohno et al. |
| 2008/0136062 A1 | 6/2008 | Kasai et al. |
| 2008/0138567 A1 | 6/2008 | Ninomiya et al. |
| 2008/0174039 A1 | 7/2008 | Saijo et al. |
| 2008/0190081 A1 | 8/2008 | Oshimi |
| 2008/0190083 A1 | 8/2008 | Oshimi |
| 2008/0197544 A1 | 8/2008 | Saijo et al. |
| 2008/0211127 A1 | 9/2008 | Naruse et al. |
| 2008/0213485 A1 | 9/2008 | Shibata |
| 2008/0236115 A1 | 10/2008 | Sakashita |
| 2008/0236122 A1 | 10/2008 | Ito |
| 2008/0236724 A1 | 10/2008 | Higuchi |
| 2008/0237942 A1 | 10/2008 | Takamatsu |
| 2008/0241015 A1 | 10/2008 | Kudo et al. |
| 2008/0241444 A1 | 10/2008 | Oshimi |
| 2008/0284067 A1 | 11/2008 | Naruse et al. |
| 2008/0305259 A1 | 12/2008 | Saijo |
| 2008/0318001 A1 | 12/2008 | Sakakibara |
| 2009/0004431 A1 | 1/2009 | Ninomiya |
| 2009/0079111 A1 | 3/2009 | Kasai et al. |
| 2009/0107879 A1 | 4/2009 | Otsuka et al. |
| 2009/0130378 A1 | 5/2009 | Imaeda et al. |
| 2009/0199953 A1 | 8/2009 | Sato |
| 2009/0202402 A1 | 8/2009 | Sato |

FOREIGN PATENT DOCUMENTS

| | | |
|---|---|---|
| EP | 1 598 102 A1 | 11/2005 |
| JP | 2001-096112 | 4/2001 |
| JP | 2001-096113 | 4/2001 |
| JP | 2002-224516 | 8/2002 |
| JP | 2004-106702 | 4/2004 |
| JP | 2004-132266 | 4/2004 |
| JP | 2004-188278 | 7/2004 |
| JP | 2004-188303 | 7/2004 |
| JP | 2004-290910 | 10/2004 |
| JP | 2004-330118 | 11/2004 |
| JP | 2004-360654 | 12/2004 |
| WO | WO 03/008068 A1 * | 1/2003 |
| WO | WO-03/099416 A1 | 12/2003 |

OTHER PUBLICATIONS

Japanese Industrial Standard, "Measuring Methods for the Specific Surface Area of Fine Ceramic Powders by Gas Adsorption Using the BET Methods,:" JSA, 1997, 20 Sheets.

U.S. Appl. No. 11/925,459.

U.S. Appl. No. 11/932,469.

U.S. Appl. No. 12/334,226, filed Feb. 29, 2008, Mizuno et al.

U.S. Appl. No. 12/400,389, filed Mar. 24, 2008, Higuchi.

U.S. Appl. No. 12/342,903, filed Dec. 23, 2008, Ohno.

U.S. Appl. No. 12/393,200, filed Mar. 27, 2008, Saijo.

U.S. Appl. No. 12/411,148, filed Mar. 27, 2008, Hiroshima.

Notice of Reasons for Rejection in JP Appln No. 2005-075970 dated Aug. 24, 2010.

* cited by examiner

HONEYCOMB STRUCTURE

CROSS-REFERENCE TO RELATED PATENT APPLICATIONS

The right of priority under 35 U.S.C. §119(a) is claimed based on Japanese Patent Application No. JP 2005-075970, filed Mar. 16, 2005, the entire disclosure of which is hereby incorporated by reference.

BACKGROUND OF THE INVENTION

1. Field of the Invention

The present invention relates to a honeycomb structure which may serve, for example, as a filter for collecting and removing particulates etc. in exhaust gas discharged from an internal combustion engine such as, for example, a diesel engine.

2. Description of the Related Art

Recently, it has been a problem that particulates such as soot contained in exhaust gas discharged from internal combustion engines of vehicles such as, for example, engines in buses or trucks, construction machines, etc. are harmful to environment or human bodies.

Therefore, there have been proposed various filters using honeycomb structures made of porous ceramics for collecting particulates in exhaust gas and purifying the exhaust gas.

As such a honeycomb structure in the background art, there has been disclosed a honeycomb filter in which a plurality of cells are defined by cell walls, and fluid including particulates is purified by the cell walls. For example, the honeycomb structure is characterized in that the specific surface area of particles forming the cell walls is not lower than 0.1 $m^2/g$ (for example, see Patent Document 1).

In such a honeycomb structure, a loss in pressure is small because the specific surface area of the particles forming the cell walls is not lower than 0.1 $m^2/g$. In addition, Patent Document 1 discloses that the honeycomb structure can prevent the lowering of efficiency in collecting particulates when the specific surface area of the particles forming the cell walls is not higher than 1.0 $m^2/g$.

[Patent Document 1] JP 2001-96112 A

The entire disclosure of JP 2001-96112 A is hereby incorporated by reference.

Generally, a filter serving to collect particulates in exhaust gas and convert the exhaust gas from gas components such as CO, HC, etc. by means of a catalyst is requested to have a high exhaust gas purifying (converting) rate at a comparatively early stage after the start of an engine. To this end, it has been believed that the heat capacity of the honeycomb structure has to be reduced.

Means for providing a high porosity to the honeycomb structure and means for reducing the thickness of the cell walls of the honeycomb structure have been proposed as means for reducing the heat capacity of the honeycomb structure.

However, if the porosity of the honeycomb structure is increased or the cell walls are thinned, particulates will pass the cell walls easily so that the efficiency in collecting the particulates may deteriorate.

Even when the specific surface area of the particles forming the cell walls has a predetermined value as in the honeycomb structure disclosed in Patent Document 1, there is no consideration about the mutual binding condition of the particles forming the cell walls, the number of particles per unit volume, etc. Therefore, it may be impossible to ensure sufficient efficiency in collecting the particulates when the cell walls have a wide variety of thicknesses.

SUMMARY OF THE INVENTION

According to a preferred embodiment of the present invention, there has been provided a honeycomb structure, comprising a plurality of cells defined by cell walls; wherein the plurality of cells are arranged in parallel, are separated by the cell walls, and extend in a longitudinal direction of the honeycomb structure; and wherein the honeycomb structure satisfies the following relationship (1):

$$11/6 - 10/3 \times A \leq B \tag{1}$$

where A (mm) designates thickness of the cell walls, and B ($m^2/cm^3$) designates a surface area per unit volume of the cell walls.

According to yet another preferred embodiment of the present invention, there has been provided a filter comprising a honeycomb structure, such as, for example, the aforementioned honeycomb structure.

According to still another preferred embodiment of the present invention, there has been provided an exhaust gas system comprising a filter, such as, for example, the aforementioned filter.

According to still another preferred embodiment of the present invention, there has been provided motor vehicle comprising a filter, such as, for example, the aforementioned filter.

According to still another preferred embodiment of the present invention, there has been provided construction equipment comprising a filter, such as, for example, the aforementioned filter.

According to still another preferred embodiment of the present invention, there has been provided a method of making a honeycomb structure, comprising forming a raw material paste comprising a binder, a dispersion medium, and a ceramic powder; mixing the raw material paste; extruding the raw material paste; molding the paste to form a molded ceramic body; drying the molded ceramic body to form a first porous ceramic member comprising a plurality of cells which each comprise cell walls; plugging an end portion of at least some cells with a plug paste; firing the first porous ceramic member; applying adhesive paste to at least a side surface of the first porous ceramic member and laminating at least a second porous ceramic member to the first porous ceramic member; heating the first porous ceramic member, the paste and the second fired porous ceramic dried body to produce the honeycomb structure.

The present inventors were intent on research to solve the foregoing problems. As a result, the present inventors discovered that sufficient efficiency in collecting particulates could be ensured regardless of thickness of the cell walls if at least a predetermined value and a predetermined degree were ensured as the travel distance and the travel difficulty with which the particulates pass the cell walls. Further, the inventors discovered that the travel distance and the travel difficulty with which the particulates pass the cell walls had a correlation with the thickness of the cell walls and the surface area per unit volume of the cell walls. Thus, the inventors brought the invention to completion.

According to an aspect of the present invention, there has been provided a honeycomb structure wherein a plurality of cells are arranged in parallel while being separated by cell walls, and the cells extend in a longitudinal direction of the honeycomb structure, and each cell is sealed at one of end portions thereof, the honeycomb structure is characterized in that:

a relation expressed by an expression (1) is satisfied:

$$11/6 - 10/3 \times A \leq B \qquad (1)$$

where A (mm) designates thickness of the cell walls, and B (m2/cm3) designates a surface area per unit volume of the cell walls.

It is preferable, according to yet another aspect of the present invention, that the honeycomb structure further satisfies a relation expressed by an expression (2):

$$B \leq 41/6 - 10/3 \times A \qquad (2)$$

It is preferable, according to still another aspect of the present invention, that the honeycomb structure further satisfies a relation expressed by an expression (3) is satisfied:

$$\text{about } 0.1 \leq A \leq \text{about } 0.4 \qquad (3)$$

According to the honeycomb structure of embodiments of the present invention, the thickness A of the cell walls and the surface area B per unit volume of the cell walls satisfy the relation of the aforementioned expression (1). Thus, the honeycomb structure has excellent efficiency in collecting particulates. Even if the thickness of the cell walls is reduced, it is possible to ensure sufficient efficiency in collecting particulates.

Further objects, features and advantages of the present invention will become apparent from the detailed description of preferred embodiments that follows, when considered together with the accompanying figures.

DETAILED DESCRIPTION OF PREFERRED EMBODIMENTS

A honeycomb structure according to a preferred embodiment of the present invention is a honeycomb structure wherein a plurality of cells are arranged in parallel while being separated by cell walls, and the cells extend in a longitudinal direction of the honeycomb structure, and each cell is sealed at one of end portions thereof, the honeycomb structure characterized in that:

a relation expressed by an expression (1) is satisfied:

$$11/6 - 10/3 \times A \leq B \qquad (1)$$

where A (mm) designates thickness of the cell walls, and B (m²/cm³) designates a surface area per unit volume of the cell walls.

Incidentally, in the following detailed description of preferred embodiments, the "surface area per unit volume of the cell walls" will be also referred to simply as "specific surface area of the cell walls."

When the value of the specific surface area B (m²/cm³) of the cell walls is smaller than the value $11/6 - 10/3 \times A$, the travel distance with which particulates pass the cell walls is so short that the particulates pass the cell walls easily. Thus, sufficient efficiency in collecting the particulates cannot be ensured.

The sufficient efficiency in collecting the particulates, which the honeycomb structure is required to have, depends on operating conditions and measuring conditions. Generally the efficiency in collecting the particulates is not lower than about 80%. It is preferable that the efficiency in collecting the particulates is as high as possible.

In this specification, the specific surface area B of the cell walls is a value calculated by the following expression (4).

$$\text{specific surface area } B(\text{m}^2/\text{cm}^3) = BET \text{ measured value} \\ (\text{m}^2/\text{g}) \times \text{true density}(\text{g/cm}^3) \times (100 - \text{porosity}(\%))/ \\ 100 \qquad (4)$$

The BET measured value is a measured value of the specific surface area of the cell walls measured by a BET method (single-point BET method according to JIS R 1626, using samples each cut out to be about 15 mm square). The value measured by this method shows the surface area per unit mass of the cell walls.

The entire disclosure of JIS R 1626 is hereby incorporated by reference.

It is preferable that in the aforementioned honeycomb structure, the thickness A (mm) of the cell walls and the specific surface area B (m²/cm³) of the cell walls satisfy a relation expressedby the following expression (2):

$$B \leq 41/6 - 10/3 \times A \qquad (2)$$

When the value of the specific surface area B (m²/cm³) of the cell walls exceeds the value $41/6 \times 10/3 \times A$, the travel distance with which gas should pass the cell walls may be too long to pass the cell walls. Thus, loss in pressure of the honeycomb structure may be too large.

In the honeycomb structure, it is also preferable that the lower limit of the thickness A (mm) of the cell walls is about 0.1 (mm) and the upper limit thereof is about 0.4 (mm).

When the thickness of the cell walls is smaller than about 0.1 mm, the strength of the honeycomb structure may be too low. On the contrary, when the thickness of the cell walls exceeds about 0.4 mm, loss in pressure may be too large. In addition, the heat capacity of the honeycomb structure is increased so that it may be difficult to purify exhaust gas from gas components in a comparatively early stage after the start of an engine.

In the honeycomb structure according to a preferred embodiment of the present invention, a plurality of cells are arranged in parallel so as to be separated by cell walls and extend in the longitudinal direction of the honeycomb structure. Each cell is sealed up in one end portion thereof.

The honeycomb structure may be formed so that a plurality of pillar porous ceramic members each having cells arranged in parallel so as to be separated by cell walls and extend in the longitudinal direction are bound through a sealant layer (such a honeycomb structure will be hereinafter also referred to as an "aggregate type honeycomb structure"). Alternatively, the honeycomb structure may be formed out of a porous ceramic body sintered integrally as a whole (such a honeycomb structure will be hereinafter also referred to as an "integral type honeycomb structure"). When these honeycomb structures do not have to be distinguished especially, they simply will be generically named "honeycomb structure."

The honeycomb structure according to preferred embodiments of the present invention will be described below with reference to the drawings.

Figure 1:
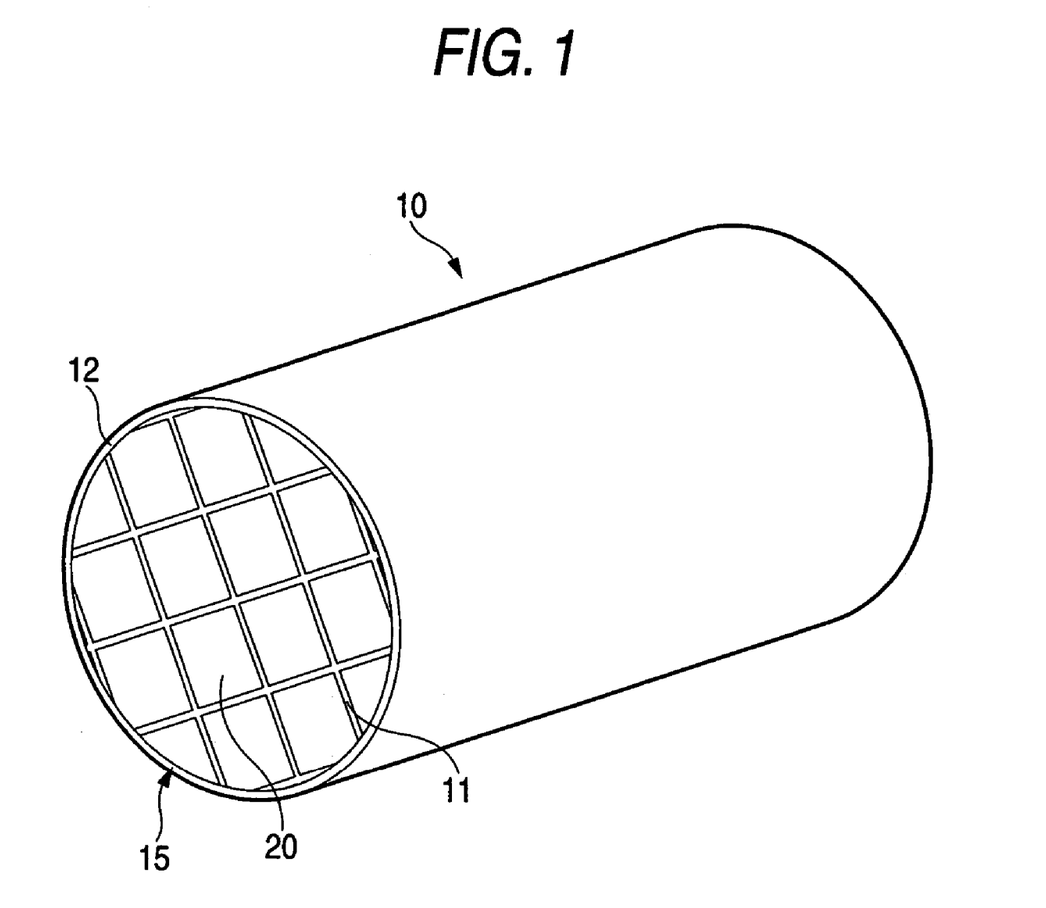
FIG. 1 is a perspective view schematically showing an example of a honeycomb structure according to a preferred embodiment of the present invention.
Figure 2A:
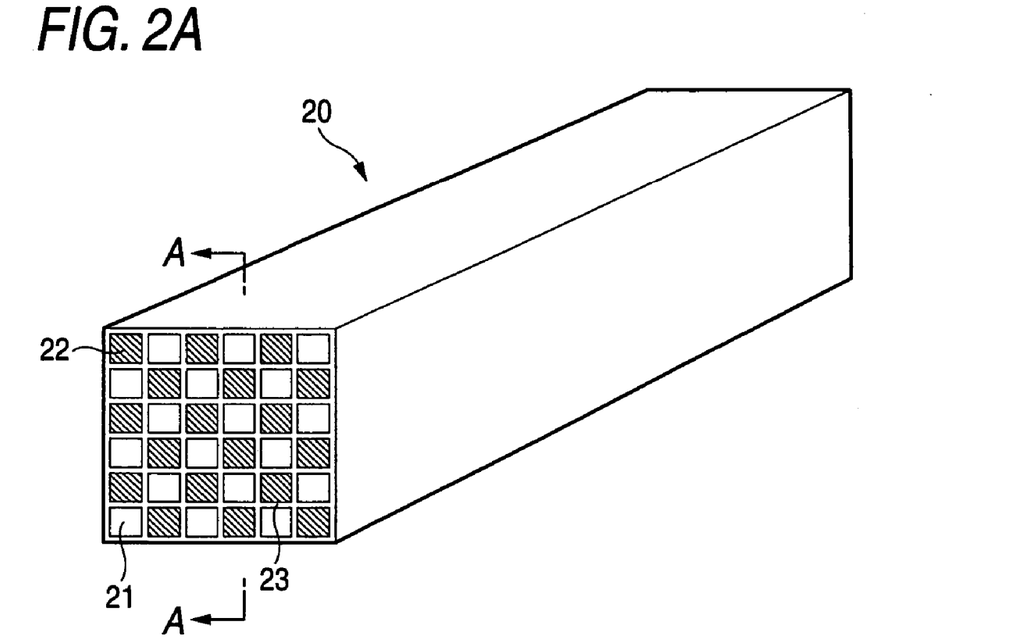
FIG. 2A is a perspective view schematically showing each porous ceramic member forming the honeycomb structure according to a preferred embodiment of the present invention.
Figure 2B:
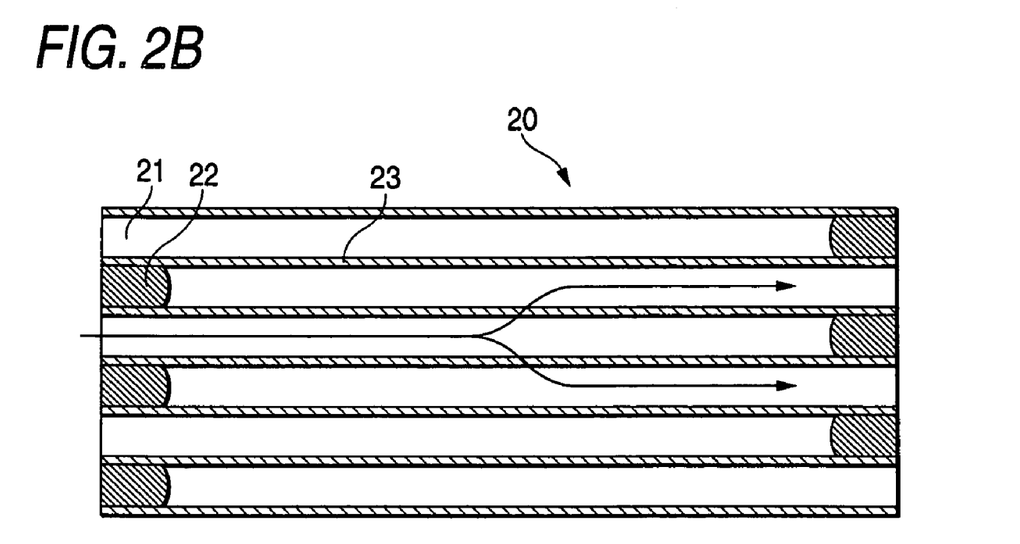
FIG. 2B is a sectional view taken on line A-A in FIG. 2A.

FIG. 1 is a perspective view schematically showing an example of the honeycomb structure according to a preferred embodiment of the present invention. FIG. 2A is a perspective view of each porous ceramic member forming the honeycomb structure shown in FIG. 1. FIG. 2B is a sectional view of the porous ceramic member, taken on line A-A in FIG. 2A.

The honeycomb structure shown in FIG. 1 is an aggregate type honeycomb structure.

As shown in FIG. 1, in an aggregate type honeycomb structure 10 according to a preferred embodiment of the present invention, a plurality of porous ceramic members 20 made of silicon carbide or the like are combined through a sealant layer (adhesive layer) 11 so as to form a cylindrical ceramic block 15. A sealant layer (coating layer) 12 is formed around the ceramic block 15.

In the aggregate type honeycomb structure 10 shown in FIG. 1, the ceramic block has a cylindrical shape. However, in the honeycomb structure according to certain preferred embodiments of the present invention, the ceramic block is not limited to the cylindrical shape. The ceramic block may have any shape such as, for example, an elliptic columnar shape or a prismatic shape if it is pillar.

In each porous ceramic member 20, as shown in FIGS. 2A and 2B, a large number of cells 21 are arranged in parallel to extend in the longitudinal direction, and cell walls (wall portions) 23 separating the cells 21 from one another serve as a filter. That is, each cell 21 formed in the porous ceramic member 20 is sealed up with a plug 22 in its one end portion on the entrance side or the exit side of exhaust gas, as shown in FIG. 2B. The exhaust gas flowing into one cell 21 cannot fail to flow out from another cell 21 after passing through the cell wall 23 separating the cells 21 from each other.

The thickness A (mm) of the cell walls 23 and the specific surface area B ($m^2/cm^3$) of the cell walls 23 satisfy the relation of the aforementioned expression (1). Therefore, the aggregate type honeycomb structure 10 has sufficient efficiency in collecting particulates.

When the thickness A (mm) of the cell walls 23 and the specific surface area B ($m^2/cm^3$) of the cell walls 23 satisfy the relations of the aforementioned expressions (2) and (3) it is possible to keep the loss in pressure low while ensuring the high efficiency in collecting particulates, and further it is possible to have sufficient strength. In addition, when a catalyst for oxidizing gas components is carried and supported by the honeycomb structure 10, exhaust gas can be converted from the gas components in a comparatively early stage after the start of the engine.

The aggregate type honeycomb structure 10 is chiefly made of porous ceramics. Examples of materials of the porous ceramics may include: nitride ceramics such as aluminum nitride, silicon nitride, boron nitride and titanium nitride; carbide ceramics such as silicon carbide, zirconium carbide, titanium carbide, tantalum carbide and tungsten carbide; oxide ceramics such as alumina, zirconia, cordierite, mullite, silica and aluminum titanate; etc. The aggregate type honeycomb structure 10 may be formed out of a complex of silicon and silicon carbide. When a complex of silicon and silicon carbide is used, it is preferable that silicon is added to reach about 0 to about 45 wt % of the total.

As for the material of the aforementioned porous ceramics, silicon carbide based ceramics high in heat resistance, superior in mechanical characteristic and high in thermal conductivity is preferred. The silicon carbide based ceramics designates ceramics containing at least about 60 wt % of silicon carbide.

The average pore size of the honeycomb structure is not limited especially. A preferable lower limit of the average pore size is about 1 µm, and a preferable upper limit thereof is about 50 µm. A more preferable lower limit is about 5 µm, and a more preferable upper limit is about 30 µm. If the average pore size is smaller than about 1 µm, the loss in pressure will be high. On the contrary, if the average pore size is larger than about 50 µm, particulates will pass the pores so easily that the particulates cannot be collected satisfactorily. Thus, the efficiency in collecting the particulates may deteriorate.

The porosity of the honeycomb structure is not limited especially. A preferable lower limit of the porosity is about 20%, and a preferable upper limit thereof is about 80%. A more preferable lower limit is about 30%, and a more preferable upper limit is about 60%. If the porosity is lower than about 20%, the pores of the honeycomb structure may be clogged easily. In contrast, if the porosity is higher than about 80%, the strength of the honeycomb structure will be so low that the honeycomb structure may be broken easily.

The porosity can be measured by a method known in the background art, for example, by a mercury intrusion method, an Archimedean method, a method using a scanning electron microscope (SEM), or the like.

The average pore size or the porosity is one of factors determining the specific surface area B of the cell walls. Accordingly, it is preferable that the average pore size and the porosity are selected suitably in consideration of the specific surface area B of the cell walls.

It is more preferable that the plug 22 and the cell walls 23 forming the porous ceramic member 20 are made of one and the same porous ceramics. Consequently, the adhesion strength between the plug 22 and the cell walls 23 can be enhanced. In addition, when the porosity of the plug 22 is adjusted to be equal to that of the cell walls 23, the coefficient of thermal expansion of the plug 22 can be matched with that of the cell walls 23 so as to prevent a gap from being produced between the plug 22 and the cell walls 23 or a crack from being produced in the plug 22 or portions of the cell walls 23 abutting against the plug 22 due to thermal stress at the time of manufacturing or using the honeycomb structure. Incidentally, the cell walls designate both the cell walls separating the cells 21 from one another and the outer circumferential portion of the porous ceramic member 20.

The thickness of the plug 22 is not limited especially. For example, when the plug 22 is made of porous silicon carbide, the thickness is preferably about 1-20 mm, and more preferably about 2-10 mm.

In the honeycomb structure 10 according to a preferred embodiment of the present invention, the sealant layer (adhesive layer) 11 is formed among the porous ceramic members 20 so as to serve to prevent exhaust gas from leaking out, and further serve as an adhesive (or sealant) for binding the plurality of porous ceramic members 20 with one another. On the other hand, the sealant layer (coating layer) 12 is formed on the outer circumferential surface of the ceramic block 15 so as to serve as a sealant for preventing the exhaust gas passing through the cells from leaking out from the outer circumferential surface of the ceramic block 15, and as a reinforcement for adjusting the shape of the ceramic block 15 or reinforcing the outer circumferential portion of the ceramic block 15 when the honeycomb structure 10 is installed in an exhaust passageway which is in communication with an internal combustion engine.

In the porous ceramic member 20, the adhesive layer 11 and the coating layer 12 may be made of one and the same material or may be made of different materials from each other. Further, when the adhesive layer 11 and the coating layer 12 are made of one and the same material, the material of the adhesive layer 11 and the material of the coating layer 12 may have one and the same compounding ratio or may have different compounding ratios from each other. In addition, the material of the adhesive layer 11 and the material of the coating layer 12 may be dense or porous.

The materials forming the adhesive layer 11 and the coating layer 12 are not limited especially. For example, a material made of an inorganic binder, an organic binder and inorganic fibers and/or inorganic particles can be used.

Examples of the aforementioned inorganic binder may include silica sol, alumina sol, etc. Each of these inorganic binders may be used singly, or two or more of them may be used together. Of the inorganic binders, silica sol is preferred.

Examples of the aforementioned organic binder may include polyvinyl alcohol, methyl cellulose, ethyl cellulose, carboxymethyl cellulose, etc. Each of these organic binders may be used singly, or two or more of them may be used together. Of the organic binders, carboxymethyl cellulose is preferred.

Examples of the aforementioned inorganic fibers may include ceramic fibers of silica-alumina, mullite, alumina, silica, etc. Each of these inorganic fibers may be used singly, or two or more of them may be used together. Of the inorganic fibers, alumina fibers are preferred.

Examples of the aforementioned inorganic particles may include carbides, nitrides, etc. Specifically, inorganic powder, whiskers, etc. made of silicon carbide, silicon nitride, boron nitride or the like can be used. Each of these inorganic particles may be used singly, or two or more of them may be used together. Of the inorganic particles, silicon carbide higher in heat conductivity is preferred.

Further, a pore forming agent such as balloons which are hollow microspheres having oxide-based ceramics as their components, spherical acrylic particles, graphite, etc. may be added to paste for forming the sealant layer as needed.

The balloons are not limited especially. Examples of the balloons may include alumina balloons, glass microballoons, Shirasu balloons, fly ash balloons (FA balloons), mullite balloons, etc. Of these balloons, alumina balloons are preferred.

In the honeycomb structure according to a preferred embodiment of the present invention, the cells may be classified into two kinds of cells, that is, an entrance-side cell group and an exit-side cell group. Each cell belonging to the entrance-side cell group is sealed up in its exit-side end portion with a plug so that the total area of its section perpendicular to the longitudinal direction increases relatively to the end surface of the honeycomb structure as a whole. Each cell belonging to the exit-side cell group is sealed up in its entrance-side end portion with the plug so that the total area of its section perpendicular to the longitudinal direction decreases relatively.

Combinations of the entrance-side cell group and the exit-side cell group include (1) the case where the area of the perpendicular section of each cell forming the entrance-side cell group is equal to that of each cell forming the exit-side cell group, and the number of cells forming the entrance-side cell group is larger than the number of cells forming the exit-side cell group, (2) the case where the area of the perpendicular section of each cell forming the entrance-side cell group is different from that of each cell forming the exit-side cell group, and the number of cells forming the entrance-side cell group is also different from the number of cells forming the exit-side cell group, and (3) the case where the area of the perpendicular section of each cell forming the entrance-side cell group is larger than that of each cell forming the exit-side cell group, and the number of cells forming the entrance-side cell group is equal to the number of cells forming the exit-side cell group.

The cells forming the entrance-side cell group and/or the cells forming the exit-side cell group may be arranged out of one kind of cells uniform in shape, perpendicular sectional area, etc., or may be arranged out of two or more kinds of cells different in shape, perpendicular sectional area, etc.

It is preferable that a catalyst is carried and supported by the honeycomb structure according to certain preferred embodiments of the present invention.

When the honeycomb structure according to a preferred embodiment of the present invention carries and supports a catalyst capable of converting exhaust gas from harmful gas components such as CO, HC, NOx, etc., the exhaust gas can be converted sufficiently from the harmful gas components due to the catalytic reaction. When the honeycomb structure according to a preferred embodiment of the present invention carries and supports a catalyst helping combustion of particulates, the particulates can be burnt and removed more easily.

As a result, the honeycomb structure according to a preferred embodiment of the present invention can improve the performance to purify (convert) the exhaust gas from the gas components, and can further reduce the energy for burning the particulates.

The catalyst is not limited especially. For example, the catalyst may be a catalyst made of noble metal such as platinum, palladium or rhodium. Alkali metals (Group I of the periodic table of the elements), alkaline-earth metals (Group II of the periodic table of the elements), rare-earth elements (Group III of the periodic table of the elements), transition metal elements, etc. may be included and carried in addition to the noble metals.

It is preferable that the catalyst is attached to the honeycomb structure after the surface of the honeycomb structure is coated with a catalyst support layer of alumina or the like in advance. Consequently, the specific surface area can be increased to enhance the degree of dispersion of the catalyst and increase the reactive portions of the catalyst. In addition, due to the catalyst support layer, the catalyst metal can be prevented from sintering.

Examples of the catalyst support layer may include oxide ceramics such as alumina, titania, zirconia, silica, etc.

The aggregate type honeycomb structure carrying and supporting the aforementioned catalyst serves as a gas purifier similar to a DPF (Diesel Particulate Filter) with a catalyst known in the background art. Therefore, detailed description about the case where the aggregate type honeycomb structure according to certain preferred embodiments of the present invention also serves as a catalyst carrier will be omitted here.

Next, description will be made of a method for manufacturing the aforementioned aggregate type honeycomb structure.

First, raw material paste having the aforementioned ceramics as its main component is extruded. Thus, square-pillar shaped ceramic molded bodies are produced.

The raw material paste is not limited especially. It is preferable that the raw material paste can attain 20-80% of porosity in the honeycomb structure which has been manufactured. For example, the raw material paste can be obtained by adding a binder, dispersion medium liquid, etc. to powder made of the aforementioned ceramics.

The particle size of the ceramic powder is not limited especially. It is preferable that the ceramic powder has low contraction in a subsequent firing process. For example, it is preferable that 100 parts by weight of powder having an average particle size of about 3-70 μm is combined with about 5-65 parts by weight of powder having an average particle size of about 0.1-1.0 μm. These particle sizes are one of factors determining the specific surface area B of the cell walls. It is therefore preferable to select the particle sizes suitably in consideration of the specific surface area B of the cell walls.

The ceramic powder may be subjected to oxidation treatment in advance.

The binder is not limited especially. Examples of the binder may include methyl cellulose, carboxymethyl cellulose, hydroxyethyl cellulose, polyethylene glycol, phenolic resin, epoxy resin, etc.

Normally, it is preferable that about 1-15 parts by weight of the binder is mixed to 100 parts by weight of the ceramic powder.

The dispersion medium liquid is not limited especially. Examples of the dispersion medium liquid may include an organic solvent such as benzene, alcohol such as methanol, water, etc.

A proper quantity of the dispersion medium liquid is mixed so that the viscosity of the raw material paste is within a predetermined range.

The ceramic powder, binder and dispersion medium liquid are mixed by ATTRITOR or the like, kneaded sufficiently by a kneader or the like, and then extruded.

A molding assistant may be added to the raw material paste as needed.

The molding assistant is not limited especially. Examples of the molding assistant may include ethylene glycol, dextrin, fatty acid soap, polyvinyl alcohol, etc.

Further, a pore forming agent such as balloons which are hollow microspheres having oxide-based ceramics as their components, spherical acrylic particles, graphite, etc. may be added to the raw material paste as needed. The balloons are not limited especially. Examples of the balloons may include alumina balloons, glass microballoons, Shirasu balloons, fly ash balloons (FA balloons), mullite balloons, etc. Of these balloons, alumina balloons are preferred.

Next, the ceramic molded body is dried, for example, by use of a microwave dryer, a hot air dryer, a dielectric dryer, a decompression dryer, a vacuum dryer, a freeze dryer, etc. so as to be formed into a ceramic dried body. Next, a predetermined amount of plug or plugging paste which will serve as a plug is charged into each exit-side end portion of the entrance-side cell group and each entrance-side end portion of the exit-side cell group. Thus, the cells are clogged and sealed up.

The plug or plugging paste is not limited especially. It is preferable that the porosity of the plug produced in a subsequent process will be about 30-75%. For example, paste similar to the aforementioned raw material paste can be used.

Next, the ceramic dried body plugged with the plug or plugging paste is degreased (for example, at about 200-500° C.) and fired (for example, at about 1,400-2,300° C.) in predetermined conditions. Thus, it is possible to manufacture a porous ceramic member 20 formed into a single sinter as a whole.

The conditions used for manufacturing a filter made of porous ceramics in the background art can be applied to the conditions with which the ceramic dried body is degreased and fired.

The firing conditions are one of factors determining the specific surface area B of the cell walls. Therefore, the firing conditions may be selected suitably in consideration of the specific surface area B of the cell walls.

Next, adhesive paste which will serve as the adhesive layer 11 is applied to the side surface of the porous ceramic member 20 and with a uniform thickness so as to form an adhesive paste layer. Another porous ceramic member 20 is laminated onto the adhesive paste layer. This process is repeated to produce a porous ceramic member assembly having predetermined dimensions.

The material forming the adhesive paste has been already described. Therefore, the description of the material will be omitted here.

Next, the porous ceramic member assembly is heated. Thus, the adhesive paste layer is dried and solidified to form the adhesive layer 11.

Next, the porous ceramic member assembly in which a plurality of porous ceramic members 20 have been bonded through the adhesive layer 11 is cut by a diamond cutter or the like so as to produce the cylindrical ceramic block 15.

The sealant layer 12 is formed out of the aforementioned sealant paste on the outer circumference of the ceramic block 15. Thus, it is possible to manufacture the honeycomb structure 10 in which the sealant layer 12 is provided in the outer circumferential portion of the cylindrical ceramic block 15 having a plurality of porous ceramic members 20 bonded through the adhesive layer 11.

After that, a catalyst is carried and supported by the honeycomb structure as needed. The catalyst may be carried and supported on the porous ceramic members which have not yet been formed into an assembly.

When the catalyst is carried and supported, it is preferable that an alumina coat (film) having a large specific surface area is formed on the surface of the honeycomb structure, and a promoter and the catalyst such as platinum are provided the surface of the alumina coat (film).

Examples of the method for forming an alumina coat (film) on the surface of the honeycomb structure may include a method in which the honeycomb structure is impregnated with a solution of a metal compound containing aluminum, such as $Al(NO_3)_3$, and heated, and a method in which the honeycomb structure is impregnated with a solution containing alumina powder, and heated.

An example of the method for giving a promoter to the alumina coat (film) may include a method in which the honeycomb structure is impregnated with a solution of a metal compound containing a rare earth element, such as $Ce(NO_3)_3$, and heated.

An example of the method for giving a catalyst to the alumina coat (film) may include a method in which the honeycomb structure is impregnated with a dinitrodiammine platinum nitrate solution ($[Pt(NH_3)_2(NO_2)_2]HNO_3$, platinum density 4.53 wt %), and heated.

Alternatively, a catalyst may be given by a method in which the catalyst is given to alumina powder in advance, and the honeycomb structure is impregnated with a solution containing the alumina powder having the catalyst given thereto, and heated.

The honeycomb structure according to this exemplary embodiment is premised on that the thickness A of the cell walls 23 and the specific surface area B of the cell walls 23 are measured before the catalyst support layer and/or the catalyst are applied to the honeycomb structure. Process of applying the catalyst support layer and/or the catalyst to a honeycomb structure changes a thickness A of its cell walls and a specific surface area B of the cell walls. Even if the honeycomb structure before the applying process satisfies, for example, the relationship (1), the resultant honeycomb structure may not satisfy the relationship (1). In this specification, for example, the expression "a honeycomb structure satisfies the relationship (1)" means that a honeycomb structure "before the applying process" satisfies the relationship (1).

It is noted that the applied catalyst and the applied catalyst support layer can be removed with acid. Therefore, even if a honeycomb structure has a catalyst and/or a catalyst support layer, thickness A of its cell walls and specific surface area B of the cell walls can be obtained after the catalyst and/or the catalyst support layer is removed.

Next, description will be made on an integral type honeycomb structure.

Figure 3A:
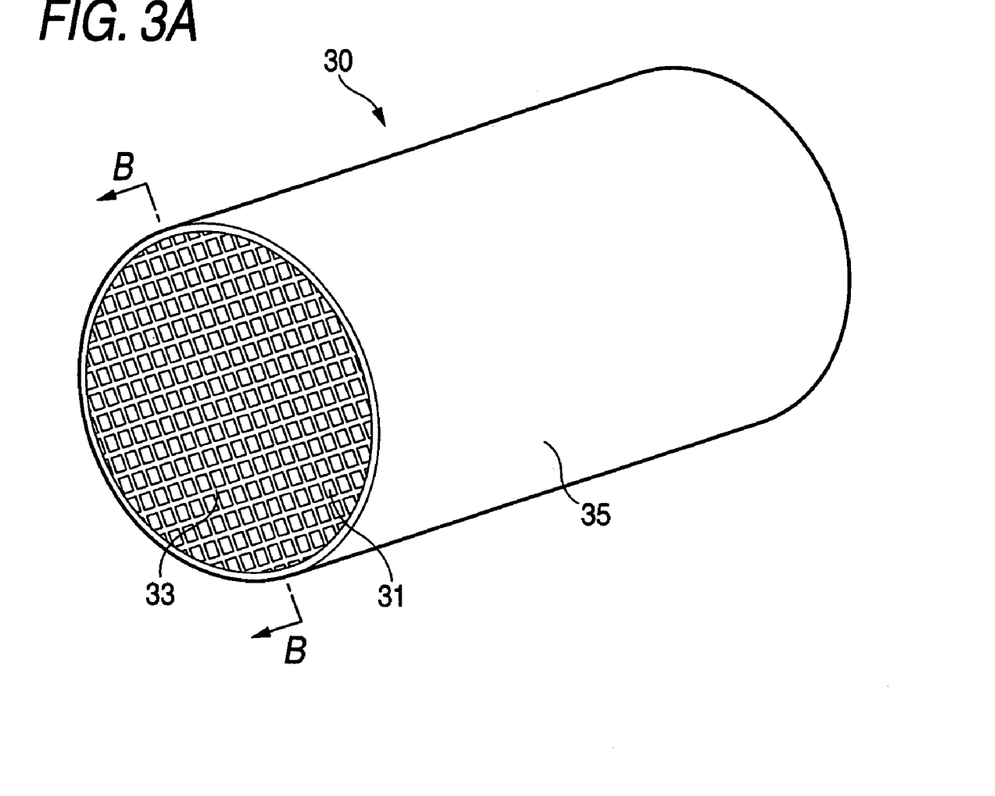
FIG. 3A is a perspective view schematically showing another example of the honeycomb structure according to a preferred embodiment of the present invention.
Figure 3B:
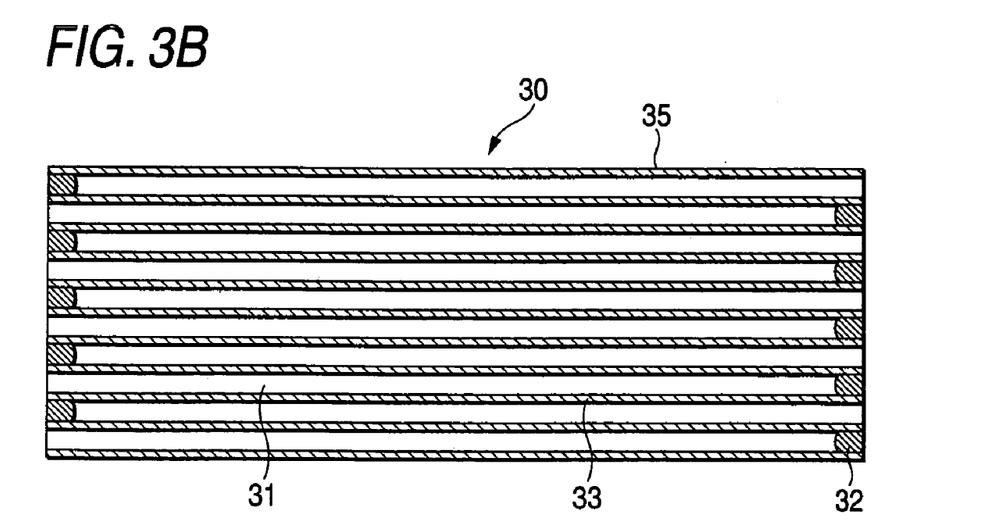
FIG. 3B is a sectional view taken on line B-B in FIG. 3A.

FIG. 3A is a perspective view schematically showing another example of the honeycomb structure according to a preferred embodiment of the present invention. FIG. 3B is a sectional view taken on line B-B in FIG. 3A.

The honeycomb structure shown in FIGS. 3A and 3B is an integral type honeycomb structure.

As shown in FIG. 3A, an integral type honeycomb structure 30 forms a cylindrical ceramic block 35 made of porous ceramics. In the ceramic block 35, a large number of cells 31 are provided in parallel so as to be separated by cell walls (wall portions) 33 and extend in the longitudinal direction of the honeycomb structure 30. Incidentally, the cell walls designate both the cell walls separating the cells 31 from one another and the outer circumferential portion of the ceramic block 35.

In the integral type honeycomb structure 30, as shown in FIG. 3B, either end portion of each cell 31 of the ceramic block 35 is sealed up with a plug 32.

That is, in the ceramic block 35 of the integral type honeycomb structure 30, predetermined cells 31 are sealed up with plug 32 in one end portion of the ceramic block 35. The other cells 31 which are not sealed up with the plug 32 in the one end portion of the ceramic block 35 are sealed up with plug 32 in the other end portion of the ceramic block 35.

In this case, exhaust gas flowing into one cell 31 cannot fail to flow out from another cell 31 after passing through the cell wall 33 separating the cells 31 from each other. Thus, the cell walls 33 separating the cells 31 from each other can be made to serve as a filter for collecting particulates.

Though not shown in FIGS. 3A and 3B, a sealant layer (coating layer) may be formed around the ceramic block 35 in the same manner as in the honeycomb structure 10 shown in FIG. 1.

In the integral type honeycomb structure 30 shown in FIGS. 3A and 3B, the ceramic block 35 has a cylindrical shape. However, the ceramic block forming the integral type honeycomb structure is not limited to the cylindrical shape. The ceramic block may have any shape such as an elliptic columnar shape or a prismatic shape if it is pillar-shaped.

Also in the integral type honeycomb structure 30 configured thus, the thickness A (mm) of the cell walls 33 and the specific surface area B of the cell walls 33 satisfy the relation of the aforementioned expression (1). Therefore, the integral type honeycomb structure 30 has sufficient efficiency in collecting particulates.

It is preferable that the thickness A (mm) of the cell walls 33 and the specific surface area B of the cell walls 33 satisfy the relations of the aforementioned expressions (2) and (3). In that case, it is possible to keep the loss in pressure low while ensuring the high efficiency in collecting particulates, and further it is possible to have sufficient strength. In addition, when a catalyst is carried and supported by the honeycomb structure 30, exhaust gas can be converted from gas components surely in a comparatively early stage after the start of an engine.

For example, materials similar to the porous ceramics forming the aforementioned aggregate type honeycomb structure can be used as porous ceramics forming the integral type honeycomb structure.

Of those materials, oxide ceramics such as cordierite is preferred. By use of the oxide ceramics, the integral type honeycomb structure can be manufactured at a low price. In addition, due to the comparatively low thermal expansion coefficient of the oxide ceramics, there is no fear that the integral type honeycomb structure is broken when it is in use.

The integral type honeycomb structure is similar to the aforementioned aggregate type honeycomb structure as to the porosity, the pore size, the material of the plug, the thickness of the cell walls, the material of the sealant layer, the dimensions and kinds of the cells, etc. Therefore, detailed description thereof will be omitted here.

A catalyst may be carried and supported by the integral type honeycomb structure. Specific examples of the catalyst are similar to those in the aforementioned aggregate type honeycomb structure. Therefore, detailed description thereof will be omitted here.

Next, description will be made on an example of a method for manufacturing an integral type honeycomb structure.

First, a raw material paste having the aforementioned ceramics as its main component is extruded, so as to form a cylindrical ceramic molded body which will serve as a ceramic block. In this event, the molded body is manufactured using the same binder, the same dispersion medium, etc. and in the same method as in the aggregate type honeycomb structure, except that the molded body has a cylindrical shape and is larger in size than that in the aggregate type honeycomb structure. Therefore, detailed description of the molded body will be omitted here.

Next, in the same manner as that in manufacture of the aggregate type honeycomb structure, the ceramic molded body is dried by use of a microwave dryer, a hot air dryer, a dielectric dryer, a decompression dryer, a vacuum dryer, a freeze dryer, etc. so as to be formed into a ceramic dried body. Next, a predetermined amount of plug or plugging paste which will serve as a plug is charged into each exit-side end portion of the entrance-side cell group and each entrance-side end portion of the exit-side cell group. Thus, the cells are clogged and sealed up.

After that, in the same manner as that in manufacture of the aggregate type honeycomb structure, the molded body is degreased and fired to produce a ceramic block. If needed, the ceramic block is cut and a sealant layer is formed thereon. Thus, an integral type honeycomb structure can be manufactured. The integral type honeycomb structure may also carry and support a catalyst in the aforementioned method.

The applications of the honeycomb structure according to a preferred embodiment of the present invention are not limited especially. It is preferable that the honeycomb structure according to a preferred embodiment of the present invention is used as an exhaust gas purifier of a vehicle.

Figure 4:
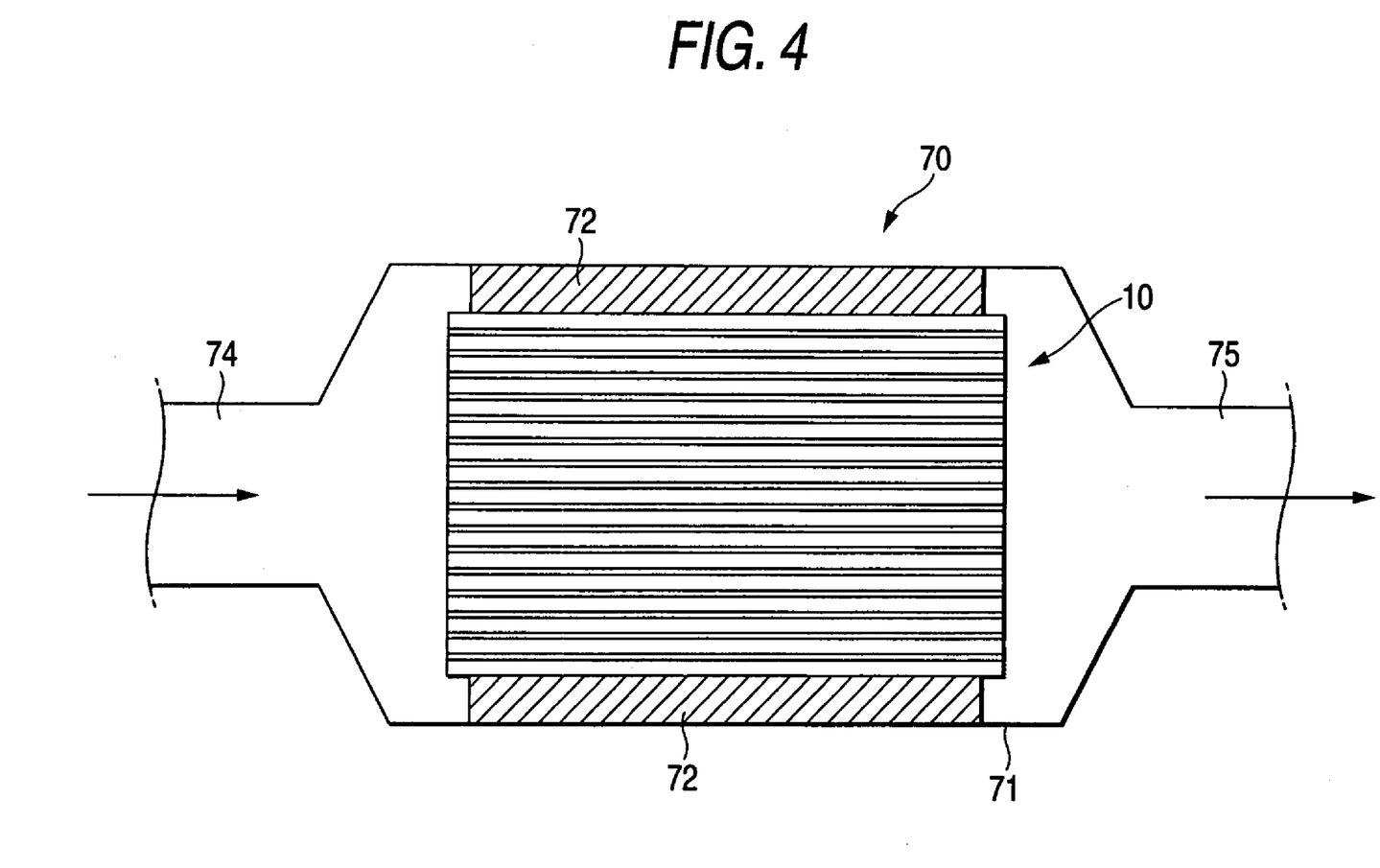
FIG. 4 is a sectional view schematically showing an example of an exhaust gas purifier of a vehicle in which the honeycomb structure according to a preferred embodiment of the present invention has been installed.

FIG. 4 is a sectional view schematically showing an example of an exhaust gas purifier of a vehicle in which the honeycomb structure according to a preferred embodiment of the present invention has been installed.

As shown in FIG. 4, an exhaust gas purifier 70 is mainly constituted by the honeycomb structure 10, a casing 71 covering the outside of the honeycomb structure 10, and a retention sealant 72 disposed between the honeycomb structure 10 and the casing 71. An introduction pipe 74 coupled with an internal combustion engine such as an automobile engine is connected to one end portion of the casing 71 from which exhaust gas will be introduced. An exhaust pipe 75 coupled with the outside is connected to the other end portion of the casing 71. The arrows in FIG. 4 show the flow of the exhaust gas.

In the exhaust gas purifier 70 configured thus, exhaust gas discharged from the internal combustion engine such as an automobile engine is introduced into the casing 71 through the introduction pipe 74. The exhaust gas flows into the honeycomb structure through the entrance-side cells and passes the cell walls. Particulates are collected by the cell walls. The exhaust gas purified thus is discharged to the outside of the honeycomb structure through the exit-side cells. The exhaust gas is discharged to the outside through the exhaust pipe 75. When the honeycomb structure carries and supports a catalyst, the exhaust gas can be converted from harmful gas components such as CO, HC and NOx, and the particulates can be also burnt and removed.

In addition, in the exhaust gas purifier 70, a plenty of particulates are accumulated in the cell walls of the honeycomb structure. When the loss in pressure increases thus, a process for regenerating the honeycomb structure is performed.

In the regeneration process, the particulates may be burnt and removed by use of a post injection system, or by use of heat of reaction generated at the time of the conversion from harmful gas components. Alternatively, gas heated by a not-shown heating unit may be made to flow into the cells of the honeycomb structure so as to heat the honeycomb structure and thereby burn and remove the particulates accumulated in the cell walls.

EXAMPLES

Examples will be represented below for describing certain preferred embodiments of the present invention in more detail. However, the invention is not limited only to these examples.

Example 1

7,000 parts by weight of coarse powder of α-silicon carbide having an average particle size of 22 μm and 3,000 parts by weight of fine powder of α-silicon carbide having an average particle size of 0.5 μm were wet-mixed. 1,100 parts by weight of organic binder (methyl cellulose), 330 parts by weight of plasticizer (Unilube made by NOF Corp.), 150 parts by weight of lubricant (glycerin) and 2,000 parts by weight of water were added to 10,000 parts by weight of the obtained mixture, and kneaded to obtain a mixture composition. After that, the mixture composition was extruded to produce a prismatic raw molded body shown in FIGS. 2A-2B.

Coarse powder subjected to oxidation treatment at 800° C. for three hours was used as the aforementioned coarse powder of α-silicon carbide.

Next, the raw molded body was dried by use of a microwave dryer or the like so as to be formed into a ceramic dried body. After that, predetermined cells were plugged with plug or plugging paste whose composition was similar to that of the raw molded body.

Next, the raw molded body was dried again by the dryer, then degreased at 400° C. and fired at 2,200° C. for three hours under an atmosphere of argon at normal pressure. Thus, a porous ceramic member 20 made of a silicon carbide sinter was manufactured. The porosity was 45%, the average pore size was 11 μm, the porous ceramic member 20 measured 34.3 mm by 34.3 mm by 150 mm, the number of cells 21 (cell density) was 46.5 cells/cm$^2$, the thickness of the cell walls 23 was 0.25 mm, and the open area ratio was 68.8%.

A large number of porous ceramic members 20 produced thus were bonded by use of heat-resistant adhesive paste containing 30 wt % of alumina fibers having an average fiber length of 20 μm, 21 wt % of silicon carbide particles having an average particle size of 0.6 μm, 15 wt % of silica sol, 5.6 wt % of carboxymethyl cellulose and 28.4 wt % of water, dried at 120° C. and successively cut by use of a diamond cutter. Thus, a cylindrical ceramic block 15 with an adhesive layer 1 mm thick was produced.

Next, 23.3 wt % of ceramic fibers (shot content: 3%, fiber length: 5-100 μm) made of alumina silicate and serving as inorganic fibers, 30.2 wt % of silicon carbide powder having an average particle size of 0.3 μm and serving as inorganic particles, 7 wt % of silica sol ($SiO_2$ content in sol: 30 wt %) serving as inorganic binder, 0.5 wt % of carboxymethyl cellulose serving as organic binder and 39 wt % of water were mixed and kneaded to prepare sealant paste.

Next, using the prepared sealant paste, a sealant paste layer 0.2 mm thick was formed in the outer circumferential portion of the ceramic block 15. The sealant paste layer was dried at 120° C. Thus, an aggregate type honeycomb structure 10 measuring 143.8 mm in diameter and 150 mm in length was manufactured.

Examples 2 and 3

Aggregate type honeycomb structures were manufactured in the same manner as in Example 1, except that the average particle size of the coarse powder of α-silicon carbide and the firing temperature of the ceramic dried body were set as shown in Table 1.

Example 4

An aggregate type honeycomb structure was manufactured in the same manner as in Example 1, except that the prismatic raw molded body was produced in the following method.

That is, 5,130 parts by weight of coarse powder of α-silicon carbide having an average particle size of 22 μm and 2,200 parts by weight of fine powder of α-silicon carbide having an average particle size of 0.5 μm were wet-mixed. 490 parts by weight of acrylic particles having an average particle size of 40 μm and serving as a pore forming agent, 700 parts by weight of organic binder (methyl cellulose), 330 parts by weight of plasticizer (Unilube made by NOF Corp.), 150 parts by weight of lubricant (glycerin) and a proper quantity of water were added to the obtained mixture, and kneaded to obtain a mixture composition. After that, the mixture composition was extruded to produce a prismatic raw molded body shown in FIGS. 2A-2B. Coarse powder subjected to oxidation treatment at 800° C. for three hours was used as the aforementioned coarse powder of α-silicon carbide. In this example, an aggregate type honeycomb structure whose porosity was 55% was manufactured.

Example 5

An aggregate type honeycomb structure was manufactured in the same manner as in Example 1, except that the average particle size of the coarse powder of α-silicon carbide was set as shown in Table 1.

Example 6

An aggregate type honeycomb structure was manufactured in the same manner as in Example 4, except that the average particle size of the coarse powder of α-silicon carbide was set as shown in Table 1.

Examples 7-10 and 12

Aggregate type honeycomb structures were manufactured in the same manner as in Example 1, except that the average particle size of the coarse powder of α-silicon carbide, the firing temperature of the ceramic dried body, the number of cells and the thickness of the cell walls were set as shown in Table 1. Table 1 also shows the open area ratios of porous ceramic members.

Examples 11 and 13

Aggregate type honeycomb structures were manufactured in the same manner as in Example 4, except that the average particle size of the coarse powder of α-silicon carbide, the firing temperature of the ceramic dried body, the number of cells and the thickness of the cell walls were set as shown in Table 1. Table 1 also shows the open area ratios of porous ceramic members.

Examples 14-17 and 19

Aggregate type honeycomb structures were manufactured in the same manner as in Example 1, except that the average particle size of the coarse powder of α-silicon carbide, the firing temperature of the ceramic dried body, the number of cells and the thickness of the cell walls were set as shown in Table 1. Table 1 also shows the open area ratios of porous ceramic members.

Examples 18 and 20

Aggregate type honeycomb structures were manufactured in the same manner as in Example 4, except that the average particle size of the coarse powder of α-silicon carbide, the firing temperature of the ceramic dried body, the number of cells and the thickness of the cell walls were set as shown in Table 1. Table 1 also shows the open area ratios of porous ceramic members.

Example 21

8,000 parts by weight of coarse powder of α-silicon carbide having an average particle size of 50 μm and 2,000 parts by weight of Si powder having an average particle size of 4 μm were wet-mixed. 1,100 parts by weight of organic binder (methyl cellulose), 330 parts by weight of plasticizer (Unilube made by NOF Corp.), 150 parts by weight of lubricant (glycerin) and a proper quantity of water were added to 10,000 parts by weight of the obtained mixture, and kneaded to obtain a mixture composition. After that, the mixture composition was extruded to produce a prismatic raw molded body shown in FIGS. 2A-2B.

Coarse powder subjected to oxidation treatment at 800° C. for three hours was used as the aforementioned coarse powder of α-silicon carbide.

Next, the raw molded body was dried by use of a microwave dryer or the like so as to be formed into a ceramic dried body. After that, predetermined cells were plugged with plug or plugging paste whose composition was similar to that of the raw molded body.

Next, the raw molded body was dried again by the dryer, then degreased at 400° C. and fired at 1,410° C. for three hours under an atmosphere of argon at normal pressure. Thus, a porous ceramic member 20 made of an Si-Sic sinter was manufactured. The porosity was 45%, the average pore size was 20 μm, the porous ceramic member 20 measured 34.3 mm by 34.3 mm by 150 mm, the number of cells 21 (cell density) was 46.5 cells/cm$^2$, the thickness of the cell walls 23 was 0.35 mm, and the open area ratio was 58.0%.

After that, in the same manner as in Example 1, a large number of porous ceramic members 20 produced thus were bonded to produce a cylindrical ceramic block 15, and a sealant layer was formed in the outer circumferential portion of the ceramic block 15. Thus, an aggregate type honeycomb structure 10 measuring 143.8 mm in diameter and 150 mm in length was manufactured.

Examples 22 and 24

Aggregate type honeycomb structures were manufactured in the same manner as in Example 21, except that the average particle size of the coarse powder of α-silicon carbide, the firing temperature of the ceramic dried body, the number of cells and the thickness of the cell walls were set as shown in Table 1. Table 1 also shows the open area ratios of porous ceramic members.

Example 23

6,664 parts by weight of coarse powder of α-silicon carbide having an average particle size of 20 μm and 1,666 parts by weight of Si powder having an average particle size of 4 μm were wet-mixed. 490 parts by weight of acrylic particles having an average particle size of 40 μm, 700 parts by weight of organic binder (methyl cellulose), 330 parts by weight of plasticizer (Unilube made by NOF Corp.), 150 parts by weight of lubricant (glycerin) and a proper quantity of water were added to the obtained mixture, and kneaded to obtain a mixture composition. After that, the mixture composition was extruded to produce a prismatic raw molded body shown in FIGS. 2A-2B. Coarse powder subjected to oxidation treatment at 800° C. for three hours was used as the aforementioned coarse powder of α-silicon carbide.

Next, the raw molded body was dried by use of a microwave dryer or the like so as to be formed into a ceramic dried body. After that, predetermined cells were plugged with plug or plugging paste whose composition was similar to that of the raw molded body.

Next, the raw molded body was dried again by the dryer, then degreased at 400° C. and fired at 1,450° C. for one hour under an atmosphere of argon at normal pressure. Thus, a porous ceramic member 20 made of an Si-Sic sinter was manufactured. The porosity was 55%, the average pore size was 15 μm, the porous ceramic member 20 measured 34.3 mm by 34.3 mm by 150 mm, the number of cells 21 (cell density) was 46.5 cells/cm$^2$, the thickness of the cell walls 23 was 0.25 mm, and the open area ratio was 68.8%.

After that, in the same manner as in Example 1, a large number of porous ceramic members 20 produced thus were bonded to produce a cylindrical ceramic block 15, and a sealant layer was formed in the outer circumferential portion of the ceramic block 15. Thus, an aggregate type honeycomb structure 10 measuring 143.8 mm in diameter and 150 mm in length was manufactured.

17
Example 25

An aggregate type honeycomb structure was manufactured in the same manner as in Example 23, except that the average particle size of the coarse powder of α-silicon carbide was set as shown in Table 1.

Comparative Example 1

An aggregate type honeycomb structure was manufactured in the same manner as in Example 1, except that the average particle size of the coarse powder of α-silicon carbide and the firing temperature of the ceramic dried body were set as shown in Table 1.

Comparative Example 2

An aggregate type honeycomb structure was manufactured in the same manner as in Example 7, except that the average particle size of the coarse powder of α-silicon carbide and the firing temperature of the ceramic dried body were set as shown in Table 1.

Comparative Example 3

An aggregate type honeycomb structure was manufactured in the same manner as in Example 14, except that the average particle size of the coarse powder of α-silicon carbide and the firing temperature of the ceramic dried body were set as shown in Table 1.

Comparative Example 4

An aggregate type honeycomb structure was manufactured in the same manner as in Example 21, except that the average particle size of the coarse powder of α-silicon carbide and the firing temperature of the ceramic dried body were set as shown in Table 1.

Evaluation (1) Measurement of Porosity, etc.

A distribution of pores in a range of from 0.1 μm to 360 μm was measured in a mercury intrusion method using a porosimeter (Autopore III 9420 made by Shimadzu Corp.) based on a mercury intrusion method.

Porosities and average pore sizes of porous ceramic members are shown in Table 1.

(2) Measurement of BET Value

A piece measuring 15 mm by 15 mm was cut out from each porous ceramic member, and used as a sample to be measured. A BET value of the sample was measured in conformity with a single-point BET method according to JIS R 1626 and by means of FLOW SORB II 2300 (made by Shimadzu Corp.).

Measured BET values are shown in Table 1.

(3) Calculation of Specific Surface Area of Cell Walls

18

The specific surface area B of the cell walls was calculated from the aforementioned BET value according to the aforementioned expression (4). The true density of the SiC sinter was 3.2 (g/cm$^3$), and the true density of the Si-SiC sinter was 3.0 (g/cm$^3$).

(4) Measurement of Loss in Pressure

Figure 5:
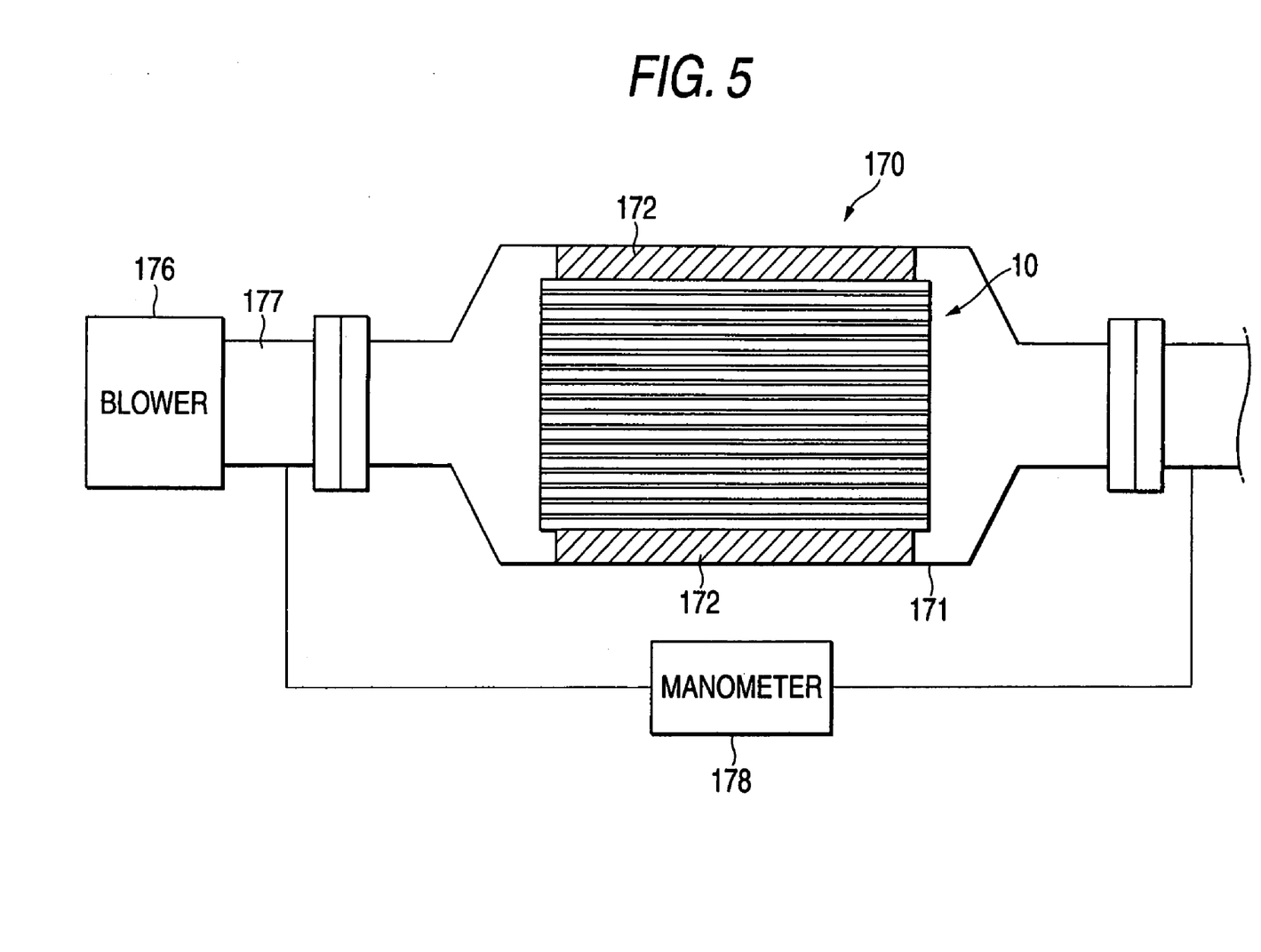
FIG. 5 is an explanatory view of a pressure loss measuring system.

The loss in pressure was measured by use of a pressure loss measuring system 170 as shown in FIG. 5. FIG. 5 is an explanatory view of the pressure loss measuring system.

In the pressure loss measuring system 170, the honeycomb structure 10 wrapped in an alumina mat 172 was fixedly disposed in a metal casing 171 inserted to an exhaust gas pipe 177 of a blower 176, and a manometer 178 is attached to the exhaust gas pipe 177 so that the manometer 178 can detect pressures in front of and at the rear of the honeycomb structure 10.

The blower 176 was operated so that the flow rate of the exhaust gas reached 750 m$^3$/h. A differential pressure (loss in pressure) 5 minutes after the start of the operation of the blower 176 was measured.

The result is shown in Table 1.

(5) Measurement of Efficiency in Collecting Particulates

Figure 6:
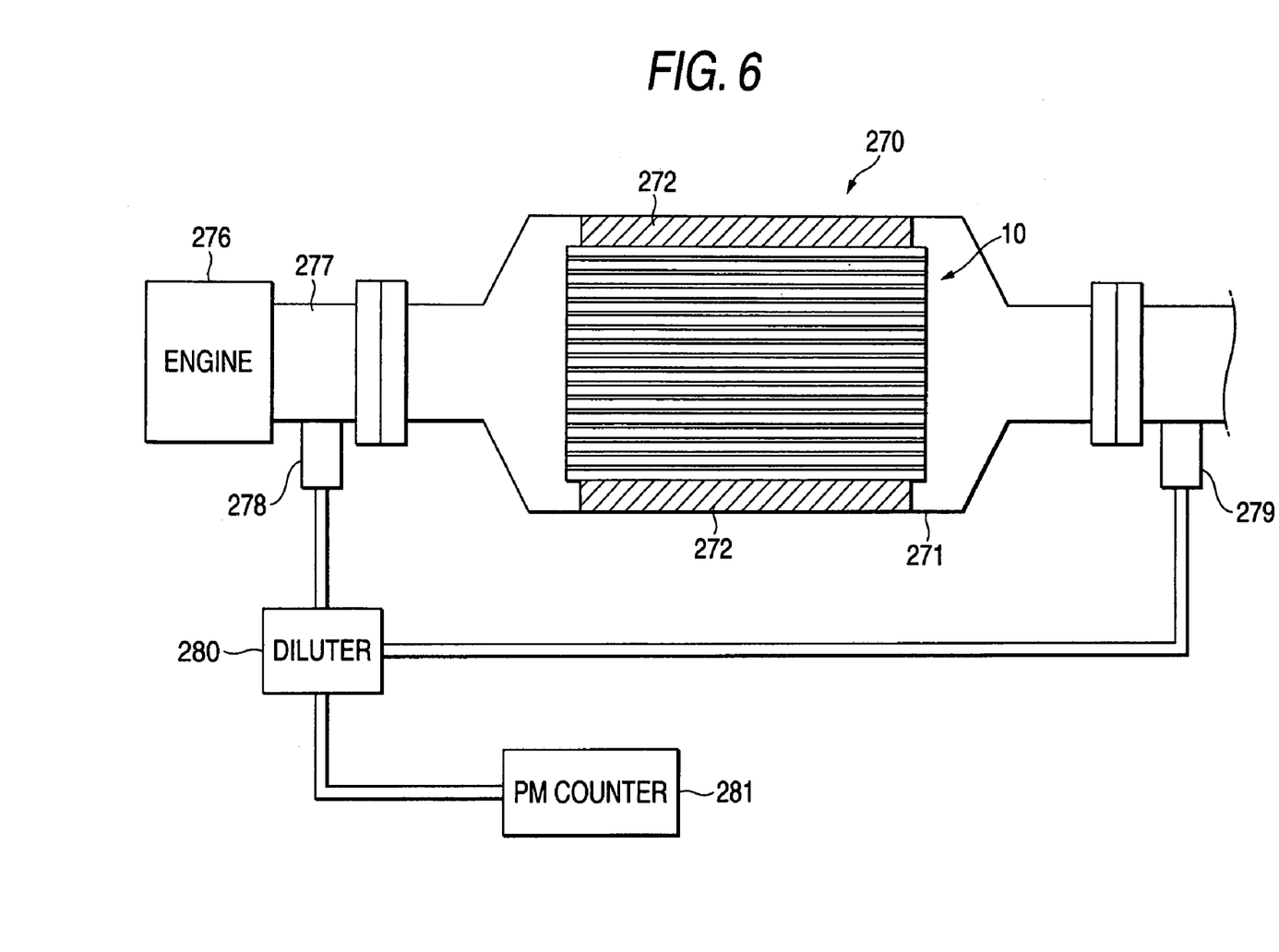
FIG. 6 is an explanatory view of an exhaust gas purification measuring system.

The efficiency in collecting particulates was measured by use of a pressure loss measuring system 270 as shown in FIG. 6. FIG. 6 is an explanatory view of an exhaust gas purification measuring system.

The pressure loss measuring system 270 was arranged as a scanning mobility particle sizer (SMPS) having a 2L common-rail type diesel engine 276, an exhaust gas pipe 277 allowing exhaust gas to flow from the engine 276, a metal casing 271 connected to the exhaust gas pipe 277 and fixing the honeycomb structure 10 wrapped in an alumina mat 272, a sampler 278 sampling the exhaust gas which had not yet flowed into the honeycomb structure 10, a sampler 279 sampling the exhaust gas which had flowed through the honeycomb structure 10, a diluter 280 diluting the exhaust gas sampled by each sampler 278, 279, and a PM counter 281 (condensation particle counter 3022A-S made by TSI Incorporated) measuring the amount of particulates included in the diluted exhaust gas.

Next, the procedure of measurement will be described. The engine 276 was operated so that the engine speed reached 2,000 min$^{-1}$ and the torque reached 47 Nm. Thus, the exhaust gas from the engine 276 was put into the honeycomb structure 10. In this event, a PM amount $P_0$ of the exhaust gas which had not yet flowed into the honeycomb structure 10 and a PM amount $P_1$ of the exhaust gas which had flowed into the honeycomb structure 10 were grasped from the numbers of PM particulates measured by the PM counter 281. The efficiency in collecting particulates was calculated using the following expression (5).

Collecting Efficiency (%)=$(P_0-P_1)/P_0 \times 100$     (5)

The result is shown in Table 1.

TABLE 1

| | Ceramic Material | Coarse Powder Particle Size (μm) | Burning Temperature (° C.) | Thickness of Cell Walls (mm) | Cell Density (cells/cm$^2$) | Open Area Ratio (%) | Porosity (%) | Pore Size (μm) | BET Value (m$^2$/g) | Specific Surface Area of Cell Walls (m$^2$/cm$^3$) | Collecting Efficiency (%) | Loss in Pressure (kPa) |
|---|---|---|---|---|---|---|---|---|---|---|---|---|
| Ex. 1 | SiC | 22 | 2200 | 0.25 | 46.5 | 68.8 | 45 | 11 | 1.71 | 3.01 | 89 | 12.8 |
| Ex. 2 | SiC | 50 | 2250 | 0.25 | 46.5 | 68.8 | 45 | 15 | 0.57 | 1.00 | 85 | 12.6 |

TABLE 1-continued

|  | Ceramic Material | Coarse Powder Particle Size (μm) | Burning Temperature (° C.) | Thickness of Cell Walls (mm) | Cell Density (cells/cm$^2$) | Open Area Ratio (%) | Porosity (%) | Pore Size (μm) | BET Value (m$^2$/g) | Specific Surface Area of Cell Walls (m$^2$/cm$^3$) | Collecting Efficiency (%) | Loss in Pressure (kPa) |
|---|---|---|---|---|---|---|---|---|---|---|---|---|
| Ex. 3 | SiC | 7 | 2200 | 0.25 | 46.5 | 68.8 | 45 | 7 | 3.40 | 5.98 | 92 | 13.1 |
| Ex. 4 | SiC | 22 | 2200 | 0.25 | 46.5 | 68.8 | 55 | 18 | 2.08 | 3.00 | 85 | 12.7 |
| Ex. 5 | SiC | 5 | 2200 | 0.25 | 46.5 | 68.8 | 45 | 5 | 3.69 | 6.49 | 93 | 14.2 |
| Ex. 6 | SiC | 7 | 2200 | 0.25 | 46.5 | 68.8 | 55 | 18 | 4.51 | 6.49 | 88 | 14.0 |
| Ex. 7 | SiC | 22 | 2200 | 0.1 | 93.0 | 81.6 | 45 | 11 | 1.71 | 3.01 | 84 | 9.4 |
| Ex. 8 | SiC | 40 | 2200 | 0.1 | 93.0 | 81.6 | 45 | 13 | 0.86 | 1.51 | 82 | 9.2 |
| Ex. 9 | SiC | 10 | 2200 | 0.1 | 93.0 | 81.6 | 45 | 10 | 3.12 | 5.49 | 86 | 9.7 |
| Ex. 10 | SiC | 5 | 2200 | 0.1 | 93.0 | 81.6 | 45 | 5 | 3.69 | 6.49 | 89 | 9.9 |
| Ex. 11 | SiC | 22 | 2200 | 0.1 | 93.0 | 81.6 | 55 | 18 | 2.08 | 3.00 | 80 | 9.4 |
| Ex. 12 | SiC | 10 | 2100 | 0.1 | 93.0 | 81.6 | 45 | 9 | 4.00 | 7.04 | 90 | 11.1 |
| Ex. 13 | SiC | 5 | 2200 | 0.1 | 93.0 | 81.6 | 55 | 15 | 4.86 | 7.00 | 85 | 11.0 |
| Ex. 14 | SiC | 22 | 2200 | 0.4 | 31.0 | 60.4 | 45 | 11 | 1.71 | 3.01 | 92 | 14.2 |
| Ex. 15 | SiC | 55 | 2300 | 0.4 | 31.0 | 60.4 | 45 | 15 | 0.29 | 0.51 | 86 | 13.8 |
| Ex. 16 | SiC | 40 | 2200 | 0.4 | 31.0 | 60.4 | 45 | 13 | 0.86 | 1.51 | 89 | 13.9 |
| Ex. 17 | SiC | 10 | 2200 | 0.4 | 31.0 | 60.4 | 45 | 10 | 3.12 | 5.49 | 94 | 14.5 |
| Ex. 18 | SiC | 22 | 2200 | 0.4 | 31.0 | 60.4 | 55 | 18 | 2.08 | 3.00 | 88 | 13.9 |
| Ex. 19 | SiC | 7 | 2200 | 0.4 | 31.0 | 60.4 | 45 | 7 | 3.40 | 5.98 | 95 | 15.7 |
| Ex. 20 | SiC | 10 | 2200 | 0.4 | 31.0 | 60.4 | 55 | 15 | 4.17 | 6.00 | 89 | 15.4 |
| Ex. 21 | Si/SiC | 50 | 1450 | 0.35 | 58.0 | 45 | 20 | 1.21 | 2.00 | 85 | 13.2 |
| Ex. 22 | Si/SiC | 30 | 1450 | 0.25 | 46.5 | 68.8 | 45 | 15 | 1.82 | 3.00 | 86 | 12.8 |
| Ex. 23 | Si/SiC | 20 | 1450 | 0.25 | 46.5 | 68.8 | 55 | 15 | 3.70 | 5.00 | 90 | 14.3 |
| Ex. 24 | Si/SiC | 10 | 1450 | 0.25 | 46.5 | 68.8 | 45 | 10 | 3.93 | 6.48 | 91 | 14.4 |
| Ex. 25 | Si/SiC | 10 | 1450 | 0.25 | 46.5 | 68.8 | 55 | 15 | 4.81 | 6.49 | 85 | 14.1 |
| Com. Ex. 1 | SiC | 55 | 2300 | 0.25 | 46.5 | 68.8 | 45 | 15 | 0.29 | 0.51 | 75 | 12.5 |
| Com. Ex. 2 | SiC | 50 | 2250 | 0.1 | 93.0 | 81.6 | 45 | 15 | 0.57 | 1.00 | 70 | 9.0 |
| Com. Ex. 3 | SiC | 60 | 2300 | 0.4 | 31.0 | 60.4 | 45 | 15 | 0.17 | 0.30 | 78 | 13.7 |
| Com. Ex. 4 | Si/SiC | 60 | 1450 | 0.25 | 46.5 | 68.8 | 45 | 10 | 0.60 | 0.99 | 72 | 12.6 |

As shown in Table 1, the honeycomb structures of Examples satisfying the relationship of the aforementioned expression (1) between the thickness A (mm) of the cell walls and the specific surface area B (m$^2$/cm$^3$) of the cell walls had a high efficiency in collecting particulates, which was not lower than about 80%. On the other hand, the honeycomb structures of Comparative Examples had a low efficiency in collecting particulates, which was lower than about 80%.

In the honeycomb structures (Examples 1-4, 7-11, 14-18 and 21-23) satisfying the relationship of the aforementioned expression (2) between the thickness A (mm) of the cell walls and the specific surface area B (m$^2$/cm$^3$) of the cell walls, there was a tendency that the loss in pressure was lower than that in any other honeycomb structure having the same thickness and material of the cell walls and satisfying the relationship of the aforementioned expression (1).

The foregoing description of preferred embodiments of the invention has been presented for purposes of illustration and description only. It is not intended to be exhaustive or to limit the invention to the precise form disclosed, and modifications and variations are possible and/or would be apparent in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto and that the claims encompass all embodiments of the invention, including the disclosed embodiments and their equivalents.

What is claimed is:

1. A honeycomb structure, comprising:
a porous ceramic member that is a fired body in which a plurality of cells are defined by cell walls, the plurality of cells are arranged in parallel, are separated by the cell walls, and extend in a longitudinal direction of the honeycomb structure,
wherein a cell density of the plurality of cells is in a range from about 31 cells/cm$^2$ to about 93 cells/cm$^2$,
wherein the honeycomb structure satisfies the following relationships:

$$(11/6)-((10/3) \times A) \leq B \leq (41/6)-((10/3) \times A) \quad (1)$$

$$\text{about } 0.1 \leq A \leq \text{about } 0.4 \quad (2)$$

where A (mm) designates a thickness of the cell walls, and B (m$^2$/cm$^3$) designates a specific surface area per unit volume of the cell walls, and
wherein by using samples each cut out from the porous ceramic member, the specific surface area per unit volume B (m$^2$/cm$^3$)=(BET measured value (m$^2$/g) measured by a single point BET method according to JIS R 1626× true density (g/cm$^3$) of the cell wall×(100−porosity (%)) of the cell wall)/100.

2. A honeycomb structure according to claim 1, wherein a catalyst is applied to at least a part of the cell walls after the honeycomb structure satisfying the relationship (1) has been achieved.

3. The honeycomb structure according to claim 1, wherein the porous ceramic member comprises at least one porous ceramic selected from the group consisting of aluminum nitride, silicon nitride, boron nitride, titanium nitride, silicon carbide, zirconium carbide, titanium carbide, tantalum carbide, tungsten carbide, alumina, zirconia, cordierite, mullite, silica, aluminum titanate, and a complex of silicon and silicon carbide.

4. The honeycomb structure according to claim 1, wherein the honeycomb structure comprises a complex of silicon and silicon carbide and wherein silicon is in a range of 0-45 wt % of the complex of silicon and silicon carbide.

5. The honeycomb structure according to claim 1, wherein the honeycomb structure comprises pores having an average pore size of about 1-50 μm.

6. The honeycomb structure according to claim 1, wherein the honeycomb structure comprises a porosity of about 20-80%.

7. The honeycomb structure according to claim 1, wherein the honeycomb structure comprises an open area ratio of about 50-80%.

8. The honeycomb structure according to claim 1, wherein the honeycomb structure comprises an aggregate honeycomb structure.

9. The honeycomb structure according to claim 1, wherein at least one cell comprises a plug and wherein the plug and the cell wall are made of the same porous ceramic material.

10. The honeycomb structure according to claim 1, wherein the honeycomb structure further comprises an adhesive layer having an inorganic binder, an organic binder, inorganic fibers and/or inorganic particles.

11. The honeycomb structure according to claim 1, wherein the honeycomb structure comprises a coating layer formed on an outer circumferential surface.

12. The honeycomb structure according to claim 2, wherein the catalyst comprises at least one of platinum, palladium, and rhodium.

13. The honeycomb structure according to claim 2, wherein the catalyst further comprises at least one of an alkali metal, an alkaline earth metal, a rare-earth element, and a transition metal element.

14. A filter comprising a honeycomb structure according to claim 1.

15. An exhaust gas system comprising a filter according to claim 14.

16. A motor vehicle comprising a filter according to claim 14.

17. A motor vehicle according to claim 16, wherein the motor vehicle comprises a bus or a truck.

18. A construction machine comprising a filter according to claim 14.

19. A method of making a honeycomb structure according to claim 1, comprising:
forming a raw material paste comprising a binder, a dispersion medium, and a ceramic powder;
mixing the raw material paste;
extruding the raw material paste;
molding the paste to form a molded ceramic body;
drying the molded ceramic body to form the porous ceramic member comprising a plurality of cells which each comprise cell walls;
plugging an end portion of at least some cells with a plug paste;
firing the porous ceramic member;
applying adhesive paste to at least a side surface of the porous ceramic member and laminating at least a second porous ceramic member to the porous ceramic member;
heating the porous ceramic member, the paste and the second fired porous ceramic dried body to produce the honeycomb structure.

20. A method according to claim 19, further comprising, cutting the honeycomb structure to produce a ceramic block.

21. A method according to claim 20, further comprising applying a coating layer to an outer circumferential surface of the ceramic block.

22. A method according to claim 19, further comprising applying a catalyst support to at least a portion of a cell wall after the honeycomb structure satisfying the relationship (1) has been achieved.

23. A method according to claim 22, further comprising applying a catalyst on at least a portion of the catalyst support.

24. The honeycomb structure according to claim 1, wherein the thickness of the cell walls A (mm) is about $0.1 < A \leqq about\ 0.35$.

* * * * *